US009888023B2

(12) United States Patent
Nantel

(10) Patent No.: US 9,888,023 B2
(45) Date of Patent: *Feb. 6, 2018

(54) PRESENTATION OF THREAT HISTORY ASSOCIATED WITH NETWORK ACTIVITY

(71) Applicant: Fortinet, Inc., Sunnyvale, CA (US)

(72) Inventor: Mathieu Nantel, Blainville (CA)

(73) Assignee: Fortinet, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/436,667

(22) Filed: Feb. 17, 2017

(65) Prior Publication Data

US 2017/0163673 A1 Jun. 8, 2017

Related U.S. Application Data

(63) Continuation of application No. 14/568,771, filed on Dec. 12, 2014, now Pat. No. 9,584,536.

(51) Int. Cl.
*H04L 29/06* (2006.01)

(52) U.S. Cl.
CPC .......... *H04L 63/1425* (2013.01); *H04L 63/02* (2013.01); *H04L 63/0209* (2013.01); *H04L 63/145* (2013.01); *H04L 2463/121* (2013.01)

(58) Field of Classification Search
CPC H04L 63/1425; H04L 63/02; H04L 2463/121
See application file for complete search history.

(56) References Cited

U.S. PATENT DOCUMENTS

| 8,682,812 | B1 | 3/2014 | Ranjan | |
| 8,850,565 | B2 * | 9/2014 | Patrick | H04L 63/1441 726/22 |
| 9,584,536 | B2 | 2/2017 | Nantel | |
| 2003/0051026 | A1 * | 3/2003 | Carter | H04L 41/00 709/224 |
| 2004/0255167 | A1 * | 12/2004 | Knight | G06Q 10/10 726/24 |
| 2005/0216421 | A1 * | 9/2005 | Barry | G06F 11/0709 705/64 |

(Continued)

OTHER PUBLICATIONS

Zhaojun et al., Analysis and implement of PIX firewall syslog log, Jun. 2010, 2nd IEEE International Conference on Information Management and Engineering, pp. 185-189.*

(Continued)

*Primary Examiner* — Kenneth Chang
(74) *Attorney, Agent, or Firm* — Hamilton, DeSanctis & Cha LLP

(57) ABSTRACT

Methods and systems for extracting, processing, displaying, and analyzing events that are associated with one or more threats are provided. According to one embodiment, threat information, including information from one or more of firewall logs and historical threat logs, is maintained in a database. Information regarding threat filtering parameters is received. Information regarding threats matching the threat filtering parameters are extracted from the database and is presented in a form of an interactive historical graph. Responsive to receiving from an administrator an indication regarding a selected subset of time in which to zoom into for further details, a list of threats within the selected subset is presented in tabular form.

18 Claims, 8 Drawing Sheets

(56) References Cited

U.S. PATENT DOCUMENTS

| | | |
|---|---|---|
| 2006/0117385 A1 | 6/2006 | Mester et al. |
| 2006/0129338 A1 | 6/2006 | Turley et al. |
| 2008/0271143 A1 | 10/2008 | Stephens et al. |
| 2009/0049547 A1 | 2/2009 | Fan |
| 2009/0300150 A1* | 12/2009 | Rudy ............ H04L 63/1425 709/222 |
| 2010/0235879 A1* | 9/2010 | Burnside .......... H04L 63/0263 726/1 |
| 2012/0311694 A1* | 12/2012 | Hrabik ............ H04L 63/1433 726/15 |
| 2013/0318603 A1 | 11/2013 | Merza |
| 2013/0326620 A1 | 12/2013 | Merza et al. |
| 2013/0333028 A1 | 12/2013 | Hagar et al. |
| 2014/0189870 A1 | 7/2014 | Singla et al. |
| 2017/0173446 A1 | 6/2017 | Costain |

OTHER PUBLICATIONS

Notice of Allowance for U.S. Appl. No. 14/568,771 dated Feb. 9, 2017.
Al-Salloum et al. Threat Analysis Model of an Agent-Based Vulnerability Mitigation Mechanism Using Bayesian Belief Networks. Jun. 2011. IEE Network Science Workshop (NSW) pp. 144-151.
Non-Final Rejection for U.S. Appl. No. 14/568,771 dated Jun. 1, 2017.

* cited by examiner

PRESENTATION OF THREAT HISTORY ASSOCIATED WITH NETWORK ACTIVITY

CROSS REFERENCE TO RELATED APPLICATIONS

This patent application is a continuation of U.S. patent application Ser. No. 14/568,771, filed Dec. 12, 2014, now U.S. Pat. No. 9,584,536, which is hereby incorporated by reference in its entirety for all purposes.

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright ©2014-2017, Fortinet, Inc.

BACKGROUND

Field

Embodiments of the present invention generally relate to the field of computer networks. In particular, various embodiments relate to methods and systems for extracting and presenting threat information relating to one or more network activities.

Description of the Related Art

The Internet is a network of networks and relates to a global collection of interconnected local, mid-level, wide area networks that use Internet Protocols as the network layer protocol. As the Internet and its underlying technologies are becoming increasingly popular, focus on Internet security and computer network security, in general, is also becoming a topic of growing concern. For instance, growing access to unlimited information available on the Internet gives rise to an opportunity to gain unauthorized access to data, which can relate to threats, such as modification of data, deletion of data, unauthorized use of computer resources, undesired interference with intended use of computer resources, among other such threats. Such threats give rise to development of techniques responsible for handling security of networks and computers served by those networks.

A firewall, as one of the commonly used network security or access control mechanisms, is typically configured to shield data and resources from computer network intruders and create an electronic boundary that prevents unauthorized users from accessing files or other content on a network or a computer. A firewall may be provided at an edge of a network ("edge firewall") that interfaces with computers or resources outside the network and functions as a mechanism for monitoring and controlling flow of data between resources within the network and those outside such that all communication, such as data packets, requests for web pages, request for specific information, which flows between the networks in either direction passes through firewall. A firewall can be configured to selectively permit communication from one network to another network or device so as to provide bi-directional security.

In addition to firewalls, multiple intrusion detection systems (IDSs) and intrusion prevention systems (IPSs) are also available to detect and/or prevent network attacks, including, but not limited to, malicious content, viruses, trojans, exploits, spywares, unexpected data stream, blocked content, security breaches, security violating applications, Domain Name System (DNS) attacks, buffer overflow operations, execution of malformed application data, execution of malicious mobile code, data theft, malware, among others to be passed onto devices of an internal network. IPSs play a vital role of detecting various kinds of attacks and securing the networks from such detected attacks. Another purpose of an IPS is to log evidence of intrusions within normal audit data. IPS is an effective security technology, which can detect, prevent and possibly react to an attack, wherein the IPS performs monitoring of activities by target sources and employs various techniques for providing security services. An IPS may also gather evidence of an attacker's activity, remove the attacker's access to the network, and reconfigure the network to resist the attacker's penetration technique and/or subsequent network access by the attacker.

Existing gateway or security management devices typically log traffic data in terms of packets in a log database, which typically includes information on all packets, whether valid or invalid. Furthermore, invalid packets may or may not necessarily relate to threats as packets may also represent non-desirable packets, such as from social networking websites, for instance. Existing systems also do not allow monitoring of specific threat level resources/parameters and generation of accurate reports that are easy to interpret. Existing traffic logs therefore are not able to explicitly point out packets or traffic data that correspond to threats, which is otherwise important for users to be able to identify, review, and analyze to evaluate the kind of threats that have been detected/prevented by the network system across one or more timeframes, sources of such threats, destination of such threats, ranking of threats based on their occurrence, among other desired objectives. Identification and analysis of threats can also help in assessing potential future threats and accordingly improve the signatures/rules that are implemented to detect/prevent/handle such threats.

In view of the foregoing, there exists a need for improved systems and methods for extracting information and attributes regarding threats and presentation regarding same.

SUMMARY

Methods and systems are described for extracting, processing, displaying, and analyzing events that are associated with one or more threats. According to one embodiment, threat information, including information from one or more of firewall logs and historical threat logs, is maintained in a database. Information regarding threat filtering parameters is received. Information regarding threats matching the threat filtering parameters are extracted from the database and is presented in a form of an interactive historical graph. Responsive to receiving from an administrator an indication regarding a selected subset of time in which to zoom into for further details, a list of threats within the selected subset is presented in tabular form.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
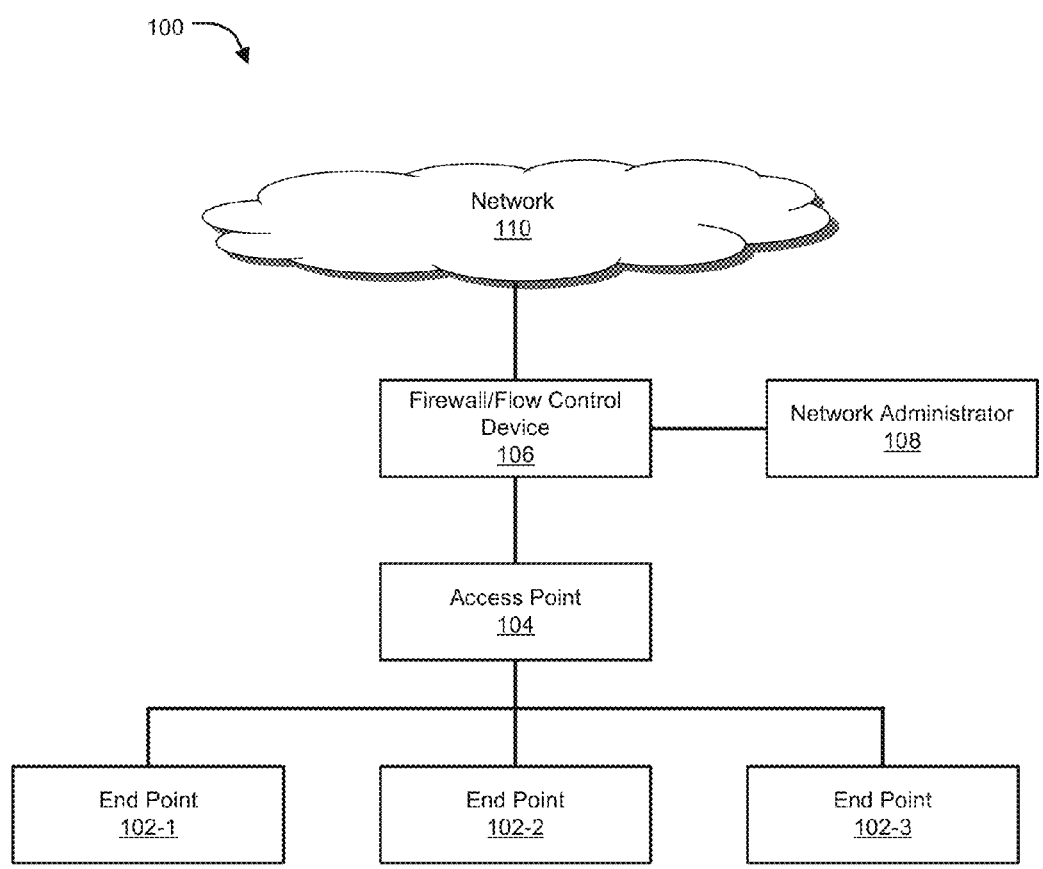
FIG. 1 illustrates an exemplary network architecture in accordance with an embodiment of the present invention.

Methods and systems are described for extracting, processing, displaying, and analyzing events that are associated with one or more threats. According to one embodiment, a method of the present disclosure includes maintaining, by a computing device, threat information in a database comprising one or more of firewall logs and historical threat logs, and receiving information regarding threat filtering parameters, by the computing device, wherein the information includes one or more types of threats to be extracted from the database, parameters of the threats, network-level details of the threats, a time interval of detection of the threats, and source-destination details of the threats. The method can further include extracting, by the computing device, information regarding threats from the database based on the threat filtering parameters and presenting, by the computing device, the extracted information in a form of a historical graph illustrating a number of threats by type during a particular period of time.

In another aspect, the method can further include receiving from a user, by the computing device, an indication regarding a selected subset of the particular period of time in which to zoom into for further details, and responsive to the indication regarding the selected subset, presenting, by the computing device, a list of threats corresponding to the selected subset, wherein the list of threats is presented in tabular form, grouped and counted by type of threat and ordered by group in accordance with their associated risk levels.

In an embodiment of the present disclosure, the database having the firewall/historical logs can be updated in real-time. In another embodiment, the firewall logs, for one or more network traffic flows, can be configured to store information regarding one or more of parameters of network traffic flows, levels of risk, packet information, source-destination information, host names, infected websites, top destinations for potential threats, top sources of potential threats, origin points of potential threats, event identifiers, types of analysis, bandwidth usage, source Internet Protocol (IP) addresses, destination IP addresses, importance, application details, port information, timestamps, time frames, user details, source device details, destination device details, levels of trust, source operating system details, virus scan levels and schedules. In another exemplary embodiment, historical threat logs can include information regarding each of multiple observed threats including one or more of a severity, a type, time, and source-destination attributes.

In an exemplary embodiment, the historical graph can include one or more of a stacked area graph, a stacked bar chart, a stacked column chart, a line chart, a point chart, a pie chart, a histogram, a line chart, a tree chart, a organizational chart, a timeline chart, a flowchart, a cartogram, a pedigree chart, a waterfall chart, a polar area chart, and a bubble chart. Embodiments of the present disclosure can also include receiving user presentation parameters for customizing the historical graph viewable parameters of the plurality of threats, wherein the customization can include viewing details of threats, viewing relationships between threats, zooming options for minutely assessing details of threats, drag-select options for positioning threats.

In another aspect, reporting the extracted historial information can include presenting one or more of trends, indicators, and suggestions based on the plurality of threats, wherein the trends can indicate manner and/or mode in which the plurality of threats have taken place, and wherein suggestions can indicate comments on potential future threats. In yet another aspect, the historical graph can be updated in real-time by continuously extracting information from the database based on the plurality of threat filters. Alternatively, the historical graph can be updated at predefined intervals by periodically extracting information from the database based on the plurality of threat filters.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of presenting and analyzing threat information based on or more filter parameters, it should be appreciated that the same has been done merely to illustrate the invention in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named FIG. 1 illustrates an exemplary network architecture 100 in accordance with an embodiment of the present invention. In the context of the present example, architecture 100 includes multiple end-points 102-1, 102-2 and 102-3, which may be collectively referred to as end-points 102 hereinafter, that are operatively coupled with external resources by means of their connection with network 110 through an access point (AP) 104 and a flow control device 106, non-limiting examples of which include a firewall, a gateway a unified threat management (UTM) device, or any other appropriate network security device. In an aspect, end-points 102 can include one or more devices (e.g., computers, laptops, tablet PCs, mobile devices, smartphones and the like) capable of making request to access and/or receiving requests/data packets. Those skilled in the art will appreciate that network architecture 100 is exemplary in nature and that various alternative structures/constructions/configurations are within the scope of the present disclosure.

According to one embodiment, flow control device 106, which may also be interchangeably referred to as network security device 106, can be operated/controlled by a network administrator 108 who can configure rules/conditions based on which incoming and/or outgoing traffic data packets can be processed. Flow control device 106 can include a firewall that can be configured between access point 104 and network 110 to protect end-points 102 from security threats (e.g., viruses, intrusions, trojans, exploits, spyware, unexpected data streams, blocked content, security breaches, security violating applications, malware attacks and Denial of Service (DoS)/Distributed DoS (DDoS) attacks). Flow control device 106 can also be configured to detect and block traffic to/from the end points 102 that poses security threat(s) to the end-points 102 or to the network 110. According to one embodiment, access point 104, may be a wireless access point, an Ethernet router, or a switch that is configured to provide connectivity between end points 102 and network 110.

In an embodiment of the present disclosure, intrusion prevention system (IPS) and or intrusion detection system (IDS) functionality can be implemented within firewall/flow control device 106. IPS/IDS can be used to classify a data packet or a group of data packets identified as threats to network 110 and/or to end points 102 as malicious, potentially associated with a virus, trojans, Domain Name System (DNS) attacks, buffer overflow operations, execution of malformed application data, execution of malicious mobile code, data theft, malware, etc. In an exemplary embodiment of the present disclosure, firewall/flow control device 106 can be configured to incorporate functionality of a network-based IPS (NIPS) system to protect end points 102 from such security threats. In yet another embodiment, functionality of a Network Behavior Analysis (NBA) system can be also be incorporated within firewall/flow control device 106, or can be configured independently. In yet another embodiment of the present system, firewall/flow control 106 can be configured with a Host based IPS system. In an embodiment of the present disclosure, firewall/flow control device 106 can be configured to implement the functionality of a signature based IDS or statistical anomaly based IDS or stateful protocol analysis IDS, or any combination of such types of IDS systems. In one embodiment, IPS and/or IDS systems can access a historical threat database stored on any element of the network for identifying and classifying the detected threats.

In an embodiment of the present disclosure, using the systems and methods of present application, a network administrator terminal 114 can extract, process and generate one or more reports in various desired formats based on attributes/parameters of threats detected and logged over a period of time. In an example implementation, network administrator terminal 108 can be configured to retrieve and analyze the event/threat/resource access requests logs stored at firewall/flow control device 106, wherein administrator terminal 114 can be configured to extract and generate generic/customized reports regarding one or more security threats from one or more of firewall logs and threat databases maintained by firewall/flow control device 106. Those skilled in the art will appreciate that although embodiments of the present disclosure may be explained in the context of a single threat log, different logs can be configured to store different threats based on severity, security policy violated by threats, duration, time, effect, type, settings, among other parameters. Furthermore, although embodiments of the present disclosure describe the threat logs as being extracted/retrieved and presented as graphs on a terminal of network administrator, the threat based graphs can be accessed anywhere (e.g., locally or remotely) and in any desired manner (e.g., via a browser-based interface to firewall/flow control device 106).

In an example implementation, network administrator terminal 108 can extract log data containing different information/parameters of the threats including network-level details of the threats, a time interval of detection of the threats, and source-destination details of the threats from firewall/flow control device 106, and analyze the log data to create a visual presentation of historical log data on network administrator terminal 108. In an example implementation, historical log data related to security threats can be classified/categorized using different parameters associated with threats received from user/network administrator, wherein the parameters can include the type of threat, time of threat, period/duration of threats, impact of threat, severity of threat, security policy violated by threats, source-destination details of threat, action taken, ports involved, volume, and any other such parameters. In an example implementation, network administrator terminal 108, on receiving user input, can provide a high level overview or a focused/zoomed view of the presentation generated based on the data log.

In an example implementation, network administrator terminal 108 can generate customized/generic reports that can include different attributes of threats, including, but not limited to timestamp/timeframe of threat, duration of threat, source-destination details of threat, severity, action taken, ports involved, volume, and impact on system, among other such parameters. In an embodiment, retrieved threats and allied information can be processed based on a network administrator's preferences and settings, and can accordingly be presented on a display device based on display/representation parameters selected by the network administrator. Network administrator preferences can include criteria on the basis of which threats are to be displayed, type/severity/frequency of threats to be presented, timeframe for which the threats are to be presented, details to be included for each threat, among other preference settings. Display/representation parameters, on the other hand, can include type of graphical/textual/media format to be used for presentation, display options such as zoom and drag to be made available, scale to be used for display, among other parameters.

Figure 2:
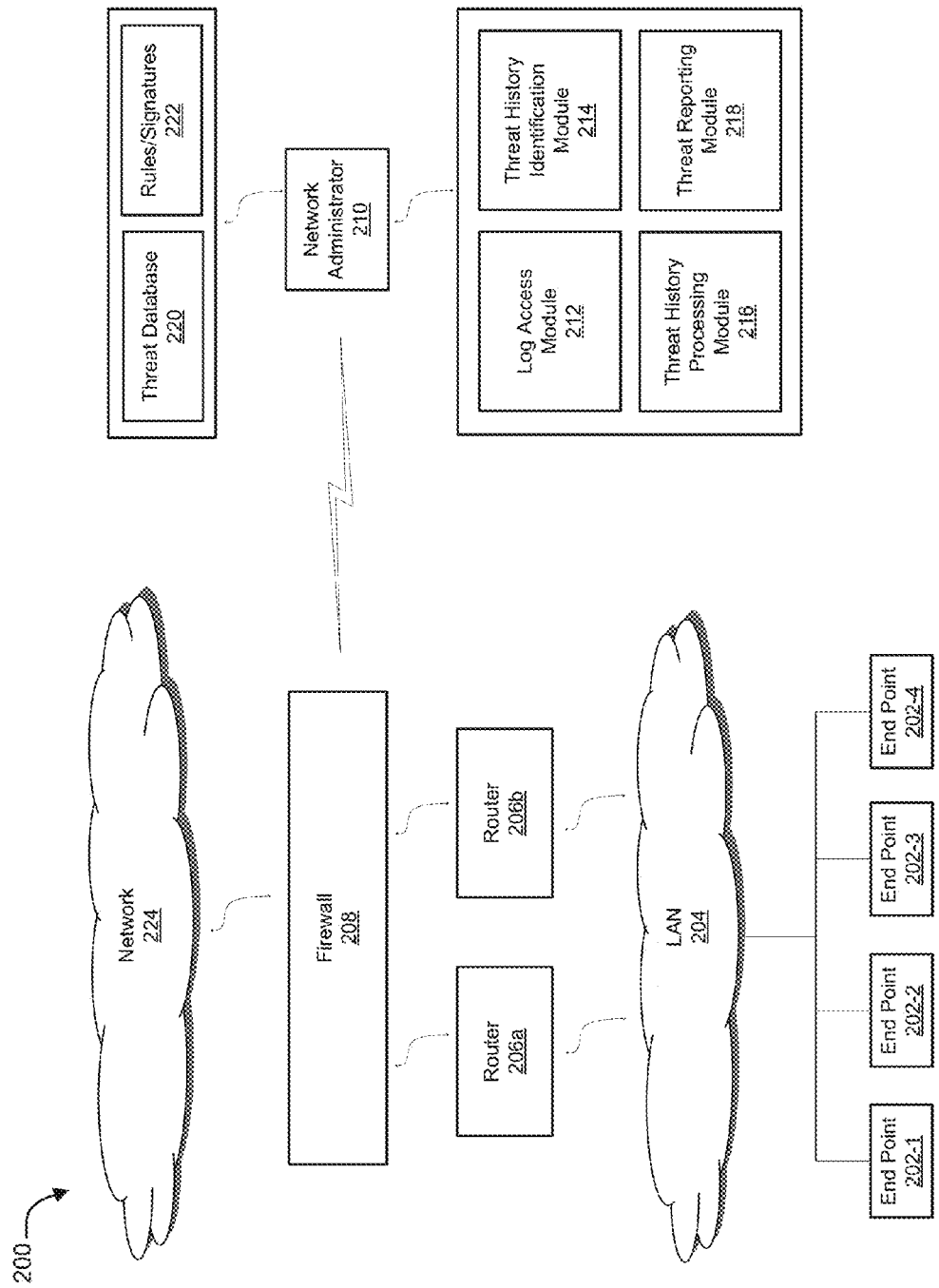
FIG. 2 illustrates a network architecture implementing a system for threat extraction and presentation in accordance with an embodiment of the present invention.

FIG. 2 illustrates an exemplary network architecture 200 in which a system for filter-based threat information extraction and presentation may be implemented in accordance with an embodiment of the present disclosure. According to one embodiment, network architecture 200 can include one or more end points 202-1, 202-2, 202-3, and 202-4, which may be collectively and interchangeably also referred to as end points 202 or computing devices 202 or client devices 202 hereinafter, which can connect to a LAN 204 or reside within LAN 204 to access a network, such as Internet 224 by means of a routing device such as router 206a and 206b (which may be collectively referred to as router or routing device 206) and a firewall 208 or other network security device.

According to one embodiment, in order to protect end points 202 against undesired network resources (e.g., known malicious resources located within or outside of network 224) and against undesired data/content reaching end-points 202, firewall 208 can be configured between LAN 204 and network 224 so as to make sure that all traffic flowing between network 224 and end points 202 is monitored and secured. In an example implementation, firewall 208 can be logically interposed between a gateway/routing device such as router 206 and network 224, wherein firewall 208 can be configured to detect and block traffic to/from end points 202 that pose a security threat to end points 202 or to LAN 204 in general. Firewall 208 can detect different security threats and protect end-points 202 and other resources of LAN 204.

In an example implementation, connectivity between network administrator terminal 210 and firewall 208 can be through internet/intranet using a wired or wireless or any other medium as known to those skilled in the art. The bidirectional connectivity/communication between end points 202 and network 224 can be monitored by firewall 208 to detect and/or log security threats. Firewall 208 can use different rules/definitions to detect security threats and can provide appropriate measures to protect end points 202 residing within LAN 204.

In an embodiment of the present disclosure, IPS and/or IDS functionality can also be implemented within firewall 208 in accordance with the security policy of the organization. In an example implementation, IPS/IDS systems can be used to classify a data packet or a group of data packets identified as threats to LAN 204/end points 202.

In an embodiment of the present disclosure, firewall 208 can be configured to incorporate functionality of a network-based IPS (NIPS) system to protect end points 202 from any security threats. In yet another embodiment, a Network Behavior Analysis (NBA) system can also be incorporated by firewall 208. In yet another embodiment of the present system, firewall 208 can be configured with Host based IPS systems. In another embodiment of the present disclosure, firewall 208 can be configured to implement the functionality of a signature based IDS, or statistical anomaly based IDS, or stateful protocol analysis IDS, or any combination of such types of IDS systems.

According to one embodiment, network administrator terminal 210 can access a threat database 220 (which may comprise multiple databases) that stores one or more logs relating to security threats detected by firewall 208. System 200 can further include a rules/signature database 222 that network administrator terminal 210 can use to configure firewall 208 in relation to the desired logging (e.g., attributes to be captured, threats to be captured, actions to take for each incoming request from end-points 202 or network 224). In an implementation, threat database 220 and rules/signature database 222 can either be stored together in a memory device coupled to LAN 204 or can be located outside LAN 204. In an embodiment, threat database 220 can include one or more data logs extracted/retrieved from traffic flow across firewall 208, and/or data retrieved from a historical threat database or from a network traffic database, which can include information on threats or attacks that were detected by other network security devices associated with LAN 204. In an embodiment of the present disclosure, threat database 220 and rules/signature database 222 can be stored in a secured database within LAN 204, or can be maintained at a third party vendor's site (not shown).

Threat database 220 can be configured to contain historical logged threat data, logged by any network security device associated with LAN 204 or can be a repository of all historical threats observed by firewall 208 or other network security devices including information pertaining to such threats. For example, historical threat database 220 can include data regarding observed threats including their severity, frequency, destination IP, originating IP, and other attributes. In accordance with one embodiment, historical threat database 220 can be updated in real-time or can be updated at predefined time intervals.

In an example implementation, rule/signature database 222 can be configured to include the signature and known details of previously encountered threats including, but not limited to, their possible source/origin, their characteristics, damage potential, known methods of handling/neutralizing/quarantining/etc. Rules/signature database 222 also be configured to include rules and organization-defined security policies and protocols for dealing with threats and attacks on the network and network elements. Configuration of firewall 208 by network administrator terminal 210 can also be based on rules/signature/definition retrieved from rules/signature database 222.

According to one embodiment, firewall 208 or any other desired network security device can be configured to store one or more logs of end-user activity and/or of incoming threats detected, wherein each such threat can have attributes (e.g., severity, duration, frequency of occurrence, time-stamp, source destination information, among other attributes) that can be logged in one or more logs and/or databases. Such threat information can be stored/organized in a variety of ways. For example, each log may separately store information regarding a specific type of threat (e.g., malware, virus or attack). In another instance, logs may store threat information for only those security threats having a severity the meets or exceeds a configurable and/or predefined set of log-specific thresholds. All such variations in terms of number of logs, manner of data storage and attributes being captured are within the scope of the present disclosure.

In an implementation of the present disclosure, one or more threat logs can be processed with respect to one or more filtering parameters to extract/present desired threat information, which can then be analyzed by network administrator 210 or at any other device (or a combination of devices) located locally or remotely by means of different visual presentations and/or customized reports generated from the extracted information. For instance, a user/network administrator may wish to have access to threat information relating to incoming threats having a severity of more than 8 (say, on a scale of 1 to 10). In another instance, a user may wish to be presented with threat information relating to incoming threats observed within the last week and having a destination address ranging from a first IP address to a second IP address. Those skilled in the art will appreciate a variety of other filtering criteria may be used to retrieve/extract desired threat information.

According to another embodiment, threat information can also be customized to include a subset of information, for example, only the time of arrival of the threat, source-destination information, and/or the frequency of occurrence of the threat so that the graphical representation of the extracted/filtered threat information can be presented with only the detailed desired by the network administrator. Parameters for the graphical representation can also be accordingly defined. A default threat information format can also be defined so that the report and/or threat history graphs can be automatically generated quickly.

According to one embodiment, a threat information extraction and presentation system includes one or more processors, and at least one communication interface device, and one or more internal data storage devices operatively coupled to the one or more processors for storing one or more of a log access module 212, a threat history identification module 214, a threat history processing module 216, and a threat reporting module 218. According to one embodiment, the functionality associated with the modules described herein by be combined or distributed in a variety of alternative ways and any such configuration is completely within the scope of the present disclosure.

According to one embodiment, firewall 208 can be configured to analyze and classify network traffic attempting to traverse firewall 208 as threats or non-threats on basis of criteria defined by a network administrator, for example, using rules/signature database 222 and/or threat database 220. Firewall 208 may also be configured to log information relating to all observed network traffic or only that which is classified as being a threat along with a set of predetermined and/or configurable attributes of the data packets. In one embodiment, firewall 208 can create a separate threat database or update information contained within threat database 220, which can be accessed by log access module 212.

Log access module 212 can access all or part of the traffic data logged by firewall 208 or any other network device to store the data in threat database 220, which can include information on threats or attacks that were detected by firewall 208 or other network security devices. In an embodiment, threat information can include any or a combination of type of threat, severity of threat, timestamp of threat, history of threat, source-destination information, frequency, among any other attribute of the threat. In an example implementation, threat database 220 can be generated as an extracted/filtered log from a traffic log maintained by the firewall 208, which pertains to detected threats only. In another embodiment of the present disclosure, threat database 220 can be used as a repository of all historical threats observed by firewall 208 including all information pertaining to such threats.

In one embodiment, threat database 220 can further be configured to store information regarding one or more of parameters of network traffic flows, levels of risk, packet information, source-destination information, host names, infected websites, top destinations for potential threats, top sources of potential threats, origin points of potential threats, event identifiers, types of analysis, bandwidth usage, source Internet Protocol (IP) addresses, destination IP addresses, importance, application details, port information, time-stamps, time frames, user details, source device details, destination device details, levels of trust, source operating system details, virus scan levels and schedules According to one embodiment, threat history identification module 214 can be configured to extract threat information from a database comprising one or more of firewall logs and historical threat logs. According to one embodiment, such threat information can be extracted based on one or more filters and/or criteria defined by the user/administrator. In another embodiment, threat information can be extracted/retrieved from the threat database 220 based on a variety of threat filtering parameters defined by a computing device such as the administrator's terminal, wherein the threat information can include one or more types of threats to be extracted from threat database 220, parameters/attributes of the threats, network-level details of the threats, time interval of detection of the threats, and source-destination details of the threats. In an instance, the user can be enabled to define one or more criteria based on which logged threat information can be processed to arrive at threat information that meets the defined criteria. Such criteria can based on type of threat (such as malware or virus, etc.), severity of threat (such as greater than a defined threshold), frequency of threat (such as one occurring more than a defined number of times), source-destination information (such as one coming from a specific IP address or intended for a particular range of IP addresses), duration of occurrence (such as threats that continuously takes place for over 2 hours), trust levels, or combination of such criteria, among any other criteria.

In an example implementation, threat identification module 214 can extract log details that are specific to the network administrator's interest. For instance, the network administrator can configure threat history identification module 212 to extract log details specific to threats targeted to particular destination device, or threat targeted to a particular type of application, or threats of particular type, threats detected during particular time interval or severity of detected threats. In another example implementation, threat history identification module 214 can mine log data and extract only relevant information that may be used for visualization or presentation on command of the network administrator.

According to one embodiment, threat history processing module 216 can be configured to process the extracted threat information based on one or more of threats to be detected, parameters of threats to be presented, network level details of the threats, time interval for which threats are to be presented, and source-destination details of the threats so as to analyze and classify the extracted threat information. Such classification can, in an exemplary implementation, be based on one or a combination of category, severity, relevance, relative importance, source and destination, and/or any other attribute of the one or more threats. In an embodiment of the present invention, criteria for processing of threats can be defined by users or can be based on policy and guidelines defined by the organization/entity. In an exemplary implementation, threat history processing module 216 can be is configured to perform analytics on the extracted threat information so as to arrive at one or more metrics, statistics, figures, that are of relevance to facilitating understanding of the type of threat activity and/or network level activity taking place.

In an example implementation, threat reporting module 218 can be configured to receive processed threat information from threat history processing module 216 and generate a report regarding the selected threats based on one or a combination of presentation parameters, timing parameters and/or threat content parameters. In an exemplary embodiment, threat reporting module 218 can further be configured to present the processed threat information in a form of a historical graph illustrating a number of threats by type during a particular period of time. Threat reporting module 218 can also be configured to receive from a user, an indication regarding a selected subset of the particular period of time in which to zoom into for further details, and in response to the indication regarding the selected subset, present a list of threats of the plurality of threats corresponding to the selected subset, wherein the list of threats is presented in tabular form, grouped and counted by type of threat, and ordered by group in accordance with their associated risk levels.

According to one embodiment, the presentation parameters can indicate a desired graphic representation of the threat information, wherein the graphic representation comprises one or a combination of textual, graphical, audio, and video based representation. In an aspect, the graphic representation may specify one or more of stacked area graph, a stacked bar chart, a stacked column chart, a line chart, a point chart, a pie chart, a histogram, a line chart, a tree chart, a organizational chart, a timeline chart, a flowchart, a cartogram, a pedigree chart, a waterfall chart, a polar area chart, and a bubble chart.

In another aspect, threat reporting module 218 can further be configured to allow users to customize the viewable parameters relating to the extracted threats, wherein the customization comprises viewing details of threats, viewing relationships between threats, zooming options for minutely assessing details of threats, drag-select options for positioning threats. In yet another aspect, threat reporting module 218 can further be configured to present one or more of trends, indicators, and suggestions based on the plurality of threats, wherein the trends indicate a manner and/or mode in which the extracted threats have taken place, and wherein suggestions indicate comments on potential future threats.

In yet another embodiment of the present invention, a threat history graph can be updated in real-time or at predefined time intervals by extracting information from threat database 220 based on a pre-selected and/or configurable set of threat filters. In another embodiment of the present invention, a time period or time interval from few hours to few years can be selected to display the threat traffic, and a list of threats can be presented in tabular form and counted by type of threat and displayed in accordance with associated risk levels. In another embodiment of the present invention, display options, such as zoom and drag can be used to select a desired time interval and all threats associated with the selected time period can be displayed along with their respective type and identifying information. In yet another embodiment of the present invention, zooming can be used to drill into and minutely assess details of a given threat and the drag option can be used for positioning of threats.

Figure 3:
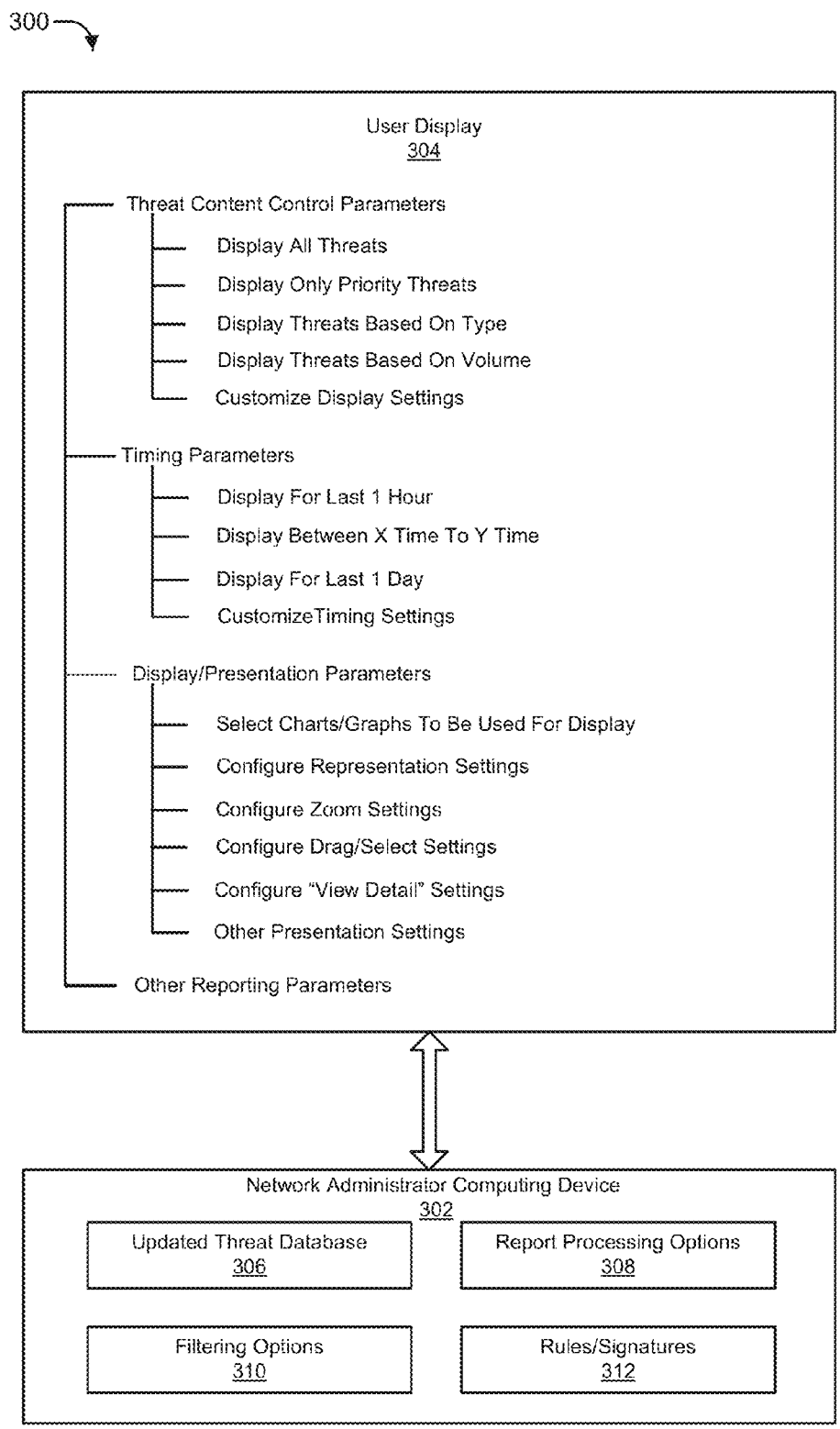
FIG. 3 illustrates a representation of parameters and attributes to be considered while presenting threats on a display device in accordance with an embodiment of the present invention.

FIG. 3 illustrates an exemplary representation 300 of parameters and attributes to be considered and/or configured while presenting threats on a display device 304 in accordance with an embodiment of the present invention. In an embodiment, user display 304 can be a part of or be operatively coupled with network administrator computing device 302 to enable the user to configure parameters based on which aggregate threat information should be processed to extract threat information of interest. As can be seen in display 304, the user can configure various threat control parameters (e.g., whether all threats are to be displayed, or only priority threats are to be presented, or threats based on type of threat are to be presented, or threats based on frequency/volume are to be presented, or any other parameter/criteria) based on which threat information is to be represented. Even display settings including the manner/mode in which the extracted threat information is to be processed may be configured by the user. For example, options may be provided to the user to specify information regarding which attributes of threat information are to be presented, whether the representation should be tabular or in the form of a pie chart and the like.

According to one embodiment, apart from threat content based parameters, timing based parameters can also be defined, wherein a user, for instance, can indicate that he/she wishes to review all or part of the attributes of threats that have taken place in the last one hour, or within a particular timeframe, or in the last one day, or any other timeframe. Similarly, display parameters such as which type of graphs/charts are to be used, representation scale to be used, zoom settings, drag/select settings, "view detail" settings, among other representation parameters can be defined by the user.

According to one embodiment, any other reporting parameter such as real-time change in reporting pattern based on threat information, periodic change in reporting pattern, user-based reporting format, context-based reporting format/presentation, among any other configuration can be defined. All such configuration changes are therefore well within the scope of the present disclosure.

In another exemplary embodiment, user display 304 can allow user to select any other parameter or a combination of parameters required for reporting. In an exemplary embodiment, network administrator computing device 302 can include means for accessing threat database 306, report processing options 308, filtering options 310, and rules/signatures 312.

Network administrator computing device 302 can be operatively coupled to user display 304 for reporting, presenting, and displaying threat data as per user requirements. Threat database 306 can be updated in real-time or periodically based on threat information extracted from firewall logs and/or historical threat logs for the threats encountered at gateway devices of the network. Filtering options 310 can allow a user to define parameters/conditions/criteria based on which the aggregated or distributed threat information can be processed to retrieve information of interest such that the extracted information meets the defined parameters. Report processing options 308 can allow the user to define how the extracted/refined threat information is to be presented on the display interface and which attributes of each threat are to be presented. Any other reporting parameter can also be incorporated as part of the report processing options. Rules/signatures 312, on the other hand, allow the user to define traffic packets that are to be classified as threats, or any other rule/condition based on which threat information can be logged in threat database.

Figure 4:
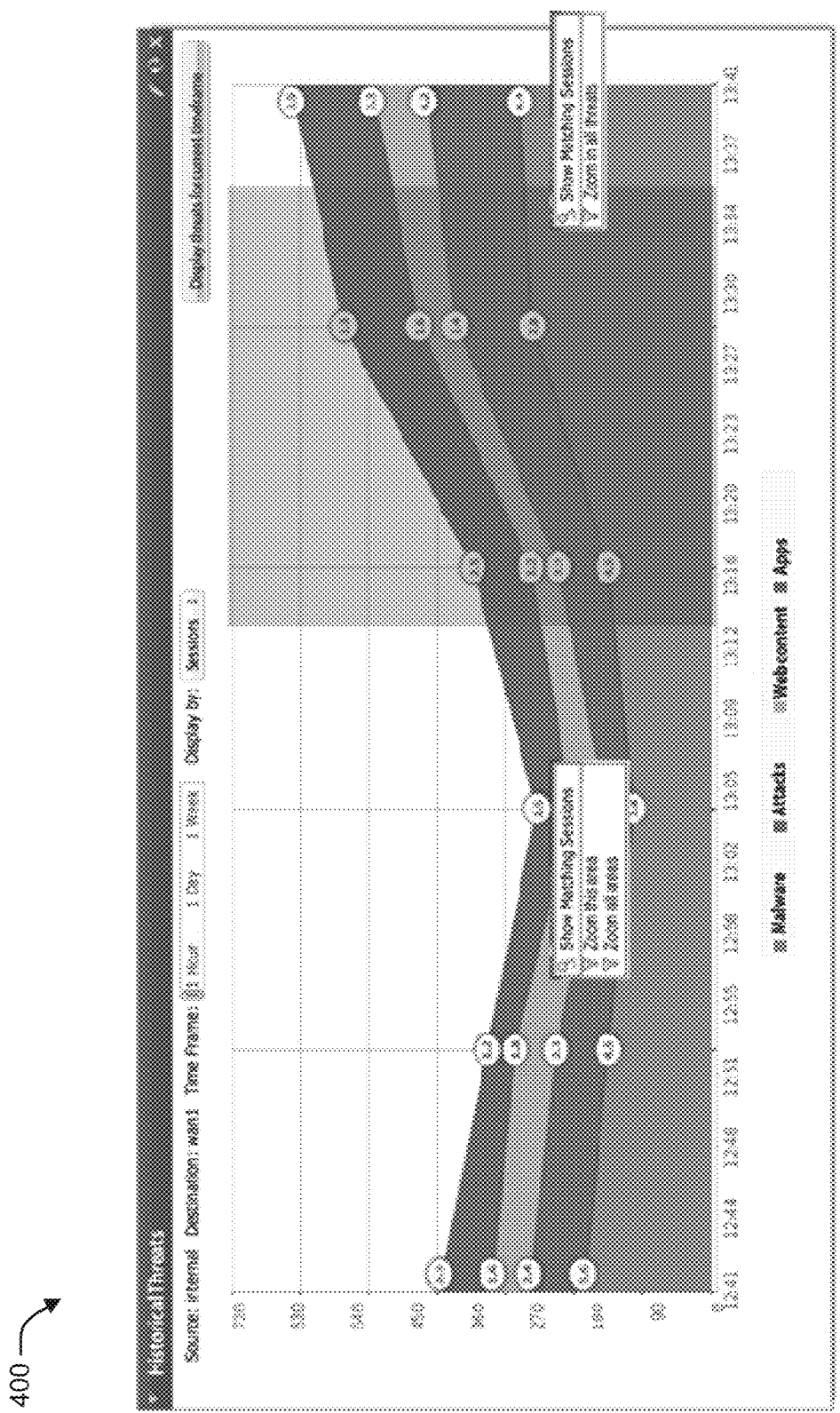
FIG. 4 illustrates an exemplary screenshot of a threat display system in accordance with an embodiment of the present invention.

FIG. 4 illustrates an exemplary screenshot 400 of a threat display system of historical threats in accordance with an embodiment of the present disclosure. In the context of the present example, the exemplary screenshot 400 is a graphical representation of network traffic observed at a network security device (e.g., a gateway device or a firewall) and categorized in terms of malware, attacks, web content and applications. Time is shown along the X-axis, whereas the number of hits is shown along the Y-axis. The four types of threats are classified based on threat type and shown in an aggregated representation. For instance, it can be interpreted from the graph that malware (lowermost layer) represents the type of threat observed the most during the displayed time interval of time 12:41 to time 13:41, followed by attacks and applications, both of which have similar threat patterns. According to one embodiment, any specific portion of the representation can also be zoomed into for further elaboration or comprehensive analysis. At the same time, instead of one hour, any other time pattern could have been defined. Various other filtering criteria can be used to broaden or narrow the threat information displayed. For instance, a user can limit the graph to observed malware threats destined for a particular IP address in a defined time range. The representation can also be colored for easier analysis of the user/administrator. In another embodiment, representation can also be configured to be self-modifying so that with new threat information being received, the representation can be dynamically updated in real-time.

In another embodiment of the present invention, threat display screen 400 can be configured and customized by users to select the threat parameters for display and the way they are displayed. The threat parameters for viewing and display can be selected based on details of threats, relationship between threats, zooming options for minutely assessing details of threats and drag select options for positioning of threats.

Figure 5:
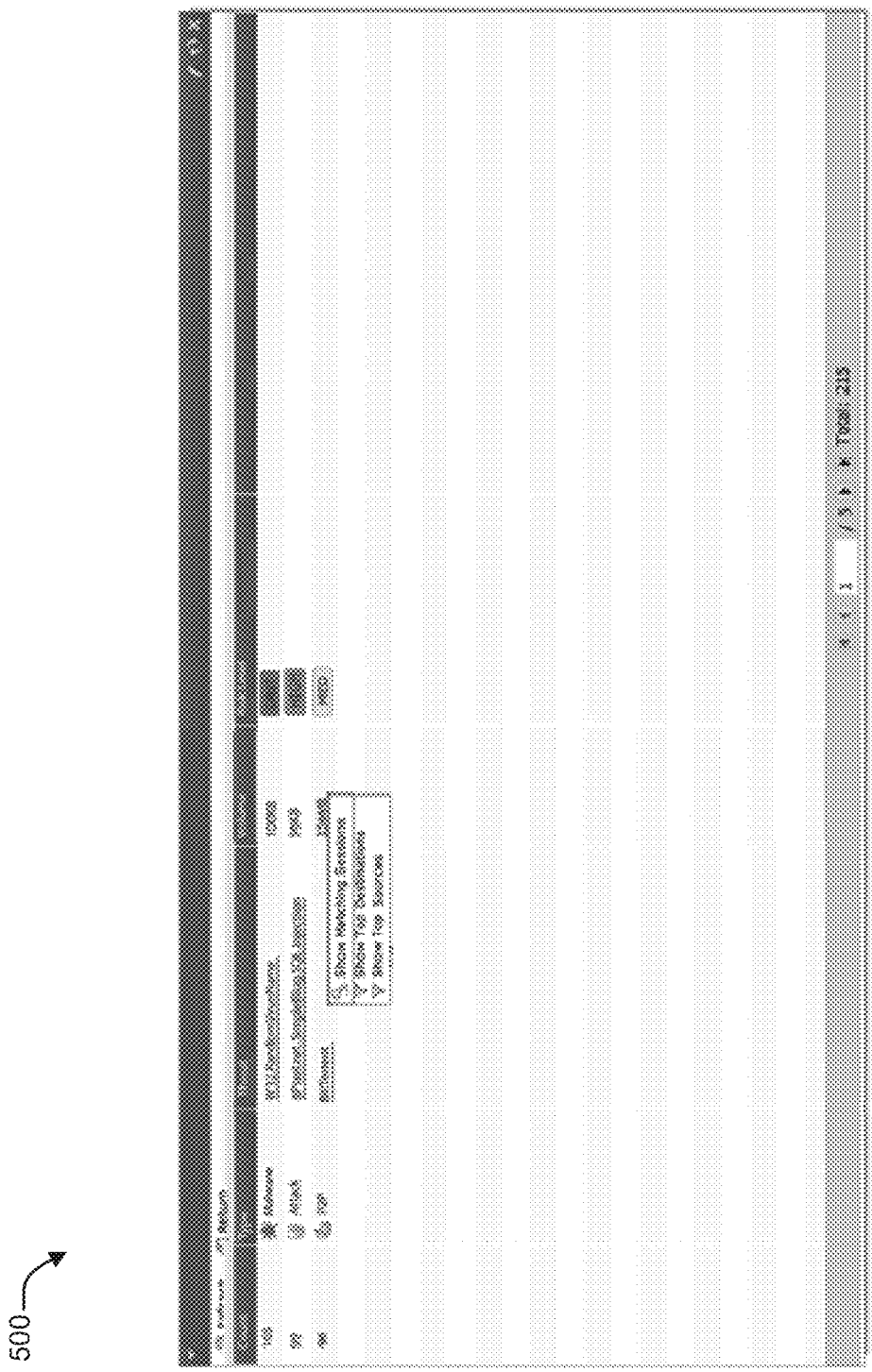
FIG. 5 illustrates an exemplary screenshot of a threat display system in accordance with an embodiment of the present invention.

FIG. 5 illustrates an exemplary screenshot 500 of a threat display system in accordance with an embodiment of the present disclosure. In the present example, the selected threat information is presented in tabular form. Threat display system can display the count of each threat (e.g., malware, attack and P2P), wherein it can be seen that malware, for the configured period, has a count of 105, attack has a count of 99, and P2P has a count of 96. Along with the type of threat, additional details regarding the threats including, but not limited to, the name, severity, source, destination, mode of attack, time period, frequency, among other details can also be presented or made available. As shown in screenshot 500, a volume of each type of threat can also be presented along with the risk level that each threat poses to the network.

In another embodiment of the present invention, threat display screen 500 can be configured and customized by users as per their requirement to select threat parameters for display and the order in which they are to be displayed, and also selection of the subset of the network for which threats are to be displayed.

Figure 6:
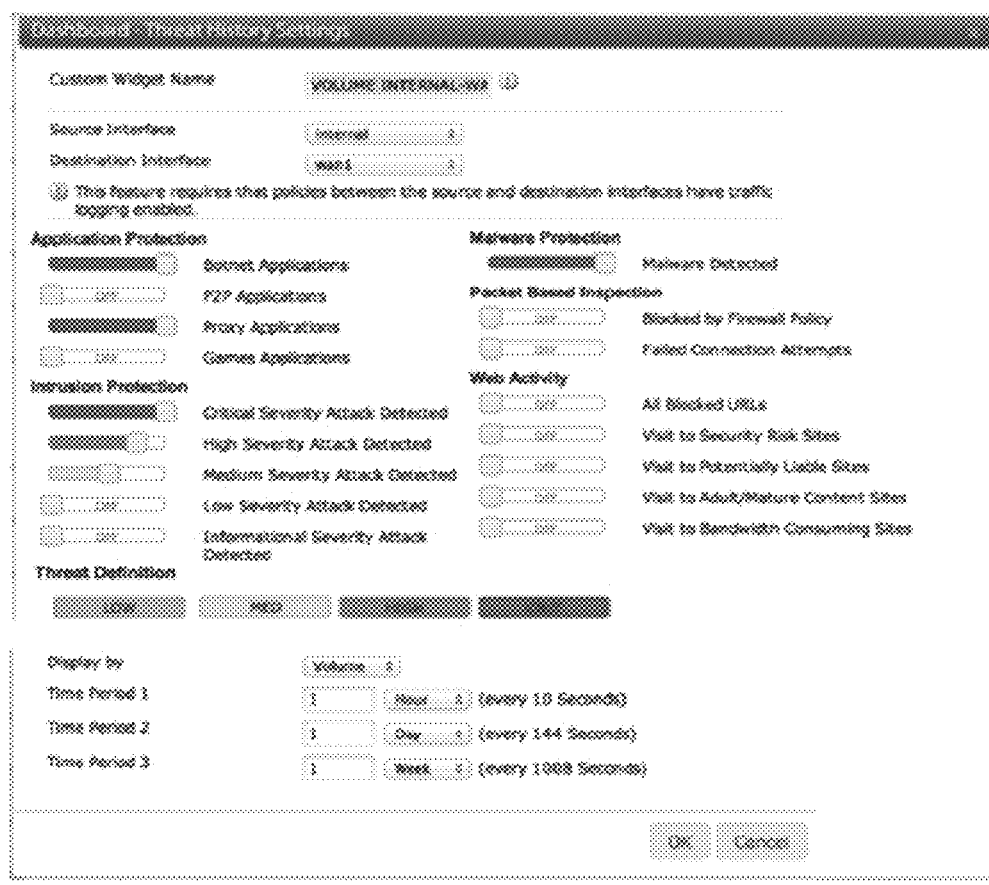
FIG. 6 illustrates an exemplary screenshot of a threat display system in accordance with an embodiment of the present invention.

FIG. 6 illustrates yet another exemplary screenshot 600 of a threat display system in accordance with an embodiment of the present disclosure. Threat display screen 600 provides a user interface to enable a user to select and/or configure the threat parameters that are to be displayed and presented to the user. According to one embodiment, threat display 600 presents a custom widget name, say volume internal WP, source and destination interface, say internal and WAN 1, respectively, details about applications which can be or which are being monitored, say Botnet application, Proxy application, P2P application, Games application, etc., and whether the protection for these applications have been switched ON or OFF, which, in present case protection is ON for Botnet and Proxy applications and is OFF for P2P and Games application, and status of IPS and what types of threats, in terms of critical, high, medium or low are being monitored and status of malware protection. The user can, at any time, using the provided ON/OFF buttons, select the parameters in terms of applications, intrusion protection systems, and type of threats to be monitored.

According to one embodiment, threat display screen 600 can allow a user to select the rules for packet based inspection, and can also allow the user to enable for automatic action by firewall as per selected option. For instance, in the present embodiment, user can select the option of switching ON or OFF of blocking by firewall and failed connection attempts for the selected subset of traffic. The display for criticality of threats can be colored coded, say blue for low, yellow for medium, orange for high, and red for critical threats for faster appreciation of data displayed and convenience of the user. Further, the user can select the time period and time interval for display of data. The time period can be selected in terms of hours, days and weeks and the time interval for display and update can be selected in terms of seconds.

In another embodiment, a threat display widget can be provided with features for free form search within the widget and/or auto complete search word. Protection can also be provided so that the user cannot rest or delete log of threat database.

Figure 7:
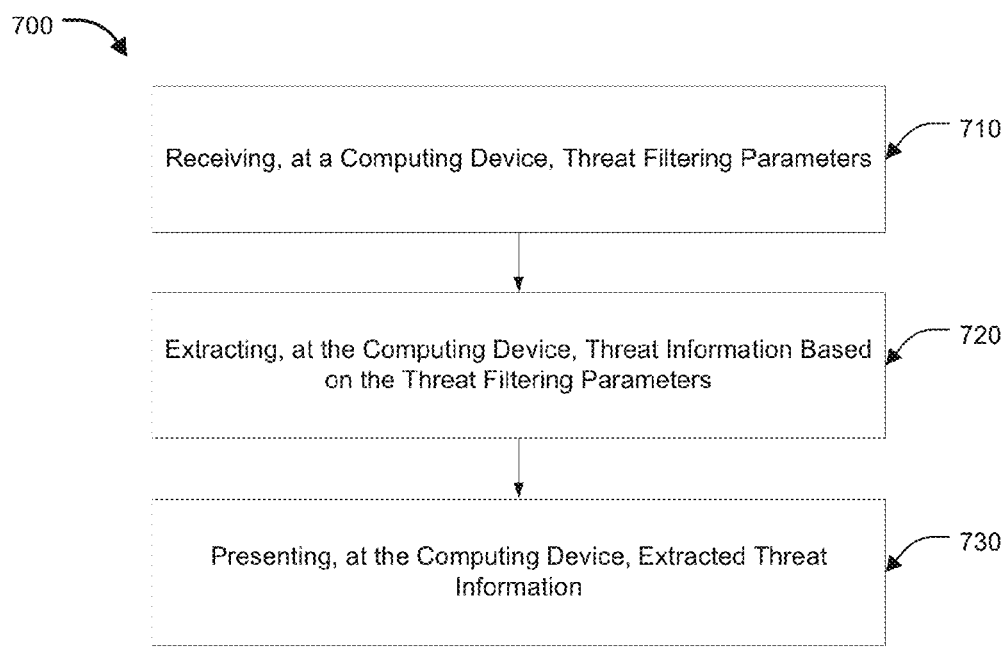
FIG. 7 is a flow diagram illustrating threat extraction and presentation processing in accordance with an embodiment of the present invention.

FIG. 7 illustrates an exemplary flow diagram 700 of threat information extraction and presentation processing in accordance with an embodiment of the present disclosure. At step 710, information regarding one or more threat filtering parameters can be received, wherein the information can include one or more types of threats to be extracted from the database, parameters of the threats, network-level details of the threats, time interval of detection of the threats, and source-destination details of the threats, among other like criteria/conditions.

At step 720, threat information is extracted from a threat database based on the threat filtering parameters. At step 730, the extracted information in a form of a historical graph can be presented illustrating a number of threats, by type during a particular period of time, for example.

Figure 8:
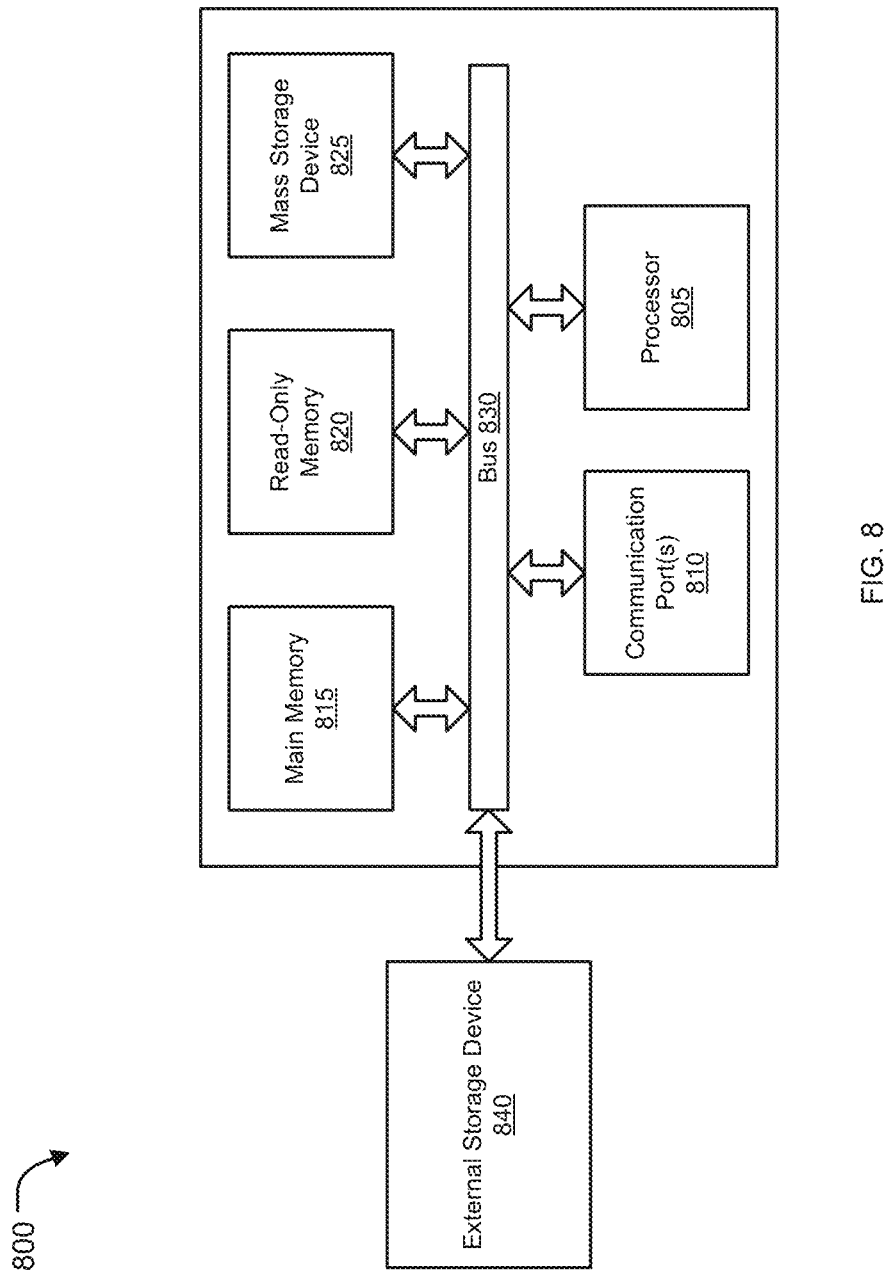
FIG. 8 is an exemplary computer system in which or with which embodiments of the present invention may be utilized.

FIG. 8 is an example of a computer system 800 with which embodiments of the present disclosure may be utilized. Computer system 800 may represent or form a part of a threat display system integrated within or implemented separate from a firewall, gateway, UTM appliance or other network security device.

Embodiments of the present disclosure include various steps, which have been described in detail above. A variety of these steps may be performed by hardware components or may be tangibly embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

As shown, computer system 800 includes a bus 830, a processor 805, communication port 810, a main memory 815, a removable storage media 840, a read only memory 820 and a mass storage 825. A person skilled in the art will appreciate that computer system 800 may include more than one processor and communication ports.

Examples of processor 805 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 805 may include various modules associated with monitoring unit as described in FIGS. 2-4. Communication port 810 can be any of an RS-232 port for use with a modem based dialup connection, a 10/100 Ethernet port, a Gigabit or 10 Gigabit port using copper or fiber, a serial port, a parallel port, or other existing or future ports. Communication port 810 may be chosen depending on a network, such a Local Area Network (LAN), Wide Area Network (WAN), a WLAN or any network to which computer system 800 connects.

Memory 815 can be Random Access Memory (RAM), or any other dynamic storage device commonly known in the art. Read only memory 820 can be any static storage device(s) such as, but not limited to, a Programmable Read Only Memory (PROM) chips for storing static information such as start-up or BIOS instructions for processor 805.

Mass storage 825 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), such as those available from Seagate (e.g., the Seagate Barracuda 7200 family) or Hitachi (e.g., the Hitachi Deskstar 7K1000), one or more optical discs, Redundant Array of Independent Disks (RAID) storage, such as an array of disks (e.g., SATA arrays), available from various vendors including Dot Hill Systems Corp., LaCie, Nexsan Technologies, Inc. and Enhance Technology, Inc.

Bus 830 communicatively couples processor(s) 805 with the other memory, storage and communication blocks. Bus 830 can be, such as a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 805 to system memory.

Optionally, operator and administrative interfaces, such as a display, keyboard, and a cursor control device, may also be coupled to bus 830 to support direct operator interaction with computer system 800. Other operator and administrative interfaces can be provided through network connections connected through communication port 810.

Removable storage media 840 can be any kind of external hard-drives, floppy drives, IOMEGA® Zip Drives, Compact Disc-Read Only Memory (CD-ROM), Compact Disc-Re-Writable (CD-RW), Digital Video Disk-Read Only Memory (DVD-ROM).

Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claim.

What is claimed is:

1. A method comprising:
maintaining, by a computing device of a private network, threat information in
a database comprising one or more of firewall logs and historical threat logs, wherein the threat information includes information regarding security threats detected by one or more network security devices associated with the private network;
receiving one or more threat filtering parameters, by the computing device, wherein the one or more threat filtering parameters are selected from a group comprising a parameter specifying one or more types of threats, a parameter specifying one or more levels of severity of the threats, a parameter specifying a source interface, a parameter specifying a destination interface, a parameter specifying a time period associated with the threats and a parameter specifying a frequency of occurrence of the threats;
extracting, by the computing device, information regarding a plurality of threats from the database based on the one or more threat filtering parameters; and
presenting, by the computing device, the extracted information in a form of a interactive historical graph illustrating a number of threats by type of threat during the time period;
receiving from an administrator of the private network, by the computing device, an indication, via interaction with the interactive historical graph, regarding a selected subset of the time period in which to zoom into for further details; and
responsive to the indication regarding the selected subset, presenting, by the computing device, the further details in a form of a list of the plurality of threats corresponding to the selected subset, wherein the list of threats is grouped by the type of threat and ordered by group in accordance with associated levels of severity of the threats in the list of threats.

2. The method of claim 1, wherein the database is updated by the one or more network security devices in real-time.

3. The method of claim 1, wherein the firewall logs, for one or more network traffic sessions include information regarding one or more of parameters of the network traffic sessions, levels of risk, packet information, source-destination information, host names, infected websites, top destinations for potential threats, top sources of potential threats, origin points of potential threats, event identifiers, types of analysis, bandwidth usage, source Internet Protocol (IP) addresses, destination IP addresses, importance, application details, port information, timestamps, time frames, user details, source device details, destination device details, levels of trust, source operating system details, virus scan levels and schedules.

4. The method of claim 1, wherein the historical threat logs comprise information regarding one or more of a level of severity, the type of threat and source-destination attributes for each of the security threats detected by the one or more network security devices.

5. The method of claim 1, wherein the interactive historical graph comprises one or more of a stacked area graph, a stacked bar chart, a stacked column chart, a line chart, a point chart, a pie chart, a histogram, a line chart, a tree chart, a organizational chart, a timeline chart, a flowchart, a cartogram, a pedigree chart, a waterfall chart, a polar area chart, and a bubble chart.

6. The method of claim 1, further comprising receiving from the administrator presentation parameters according to which the interactive historical graph is to be customized, wherein the presentation parameters include one or more of a parameter specifying a type of graph to be used for display of the plurality of threats, a parameter specifying zoom settings and a parameter specifying drag/select settings.

7. The method of claim 1, wherein said presenting, by the computing device, the extracted information in a form of an interactive historical graph comprises presenting one or more of information regarding trends and suggestions based on the plurality of threats, wherein the information regarding trends indicates one or more of a manner and mode in which the plurality of threats have taken place, and wherein the suggestions provide input regarding potential future threats.

8. The method of claim 1, wherein the interactive historical graph is updated in real-time by continuously extracting information from the database based on the plurality of threat filtering parameters.

9. The method of claim 1, wherein the interactive historical graph is updated at predefined intervals by periodically extracting information from the database based on the plurality of threat filtering parameters.

10. A non-transitory computer-readable storage medium embodying a set of instructions, which when executed by one or more processors of a computer system of a private network, causes the one or more processors to perform a method comprising:
maintaining threat information in a database comprising one or more of firewall logs and historical threat logs, wherein the threat information includes information regarding security threats detected by one or more network security devices associated with the private network;
receiving one or more threat filtering parameters selected from a group comprising a parameter specifying one or more types of threats, a parameter specifying one or more levels of severity of the threats, a parameter specifying a source interface, a parameter specifying a destination interface, a parameter specifying a time period associated with the threats and a parameter specifying a frequency of occurrence of the threats;
extracting information regarding a plurality of threats from the database based on the one or more threat filtering parameters;
presenting the extracted information in a form of an interactive historical graph illustrating a number of threats by type of threat during the time period; and
receiving from an administrator of the private network, an indication, via interaction with the interactive historical graph, regarding a selected subset of the time period in which to zoom into for further details; and
responsive to the indication regarding the selected subset, presenting the further details in a form of a list of the plurality of threats corresponding to the selected subset, wherein the list of threats is grouped by the type of threat and ordered by group in accordance with associated levels of severity of the threats in the list of threats.

11. The non-transitory computer-readable storage medium of claim 10, wherein the database is updated by the one or more network security devices in real-time.

12. The non-transitory computer-readable storage medium of claim 10, wherein the firewall logs, for one or more network traffic sessions include information regarding one or more of parameters of the network traffic sessions, levels of risk, packet information, source-destination information, host names, infected websites, top destinations for potential threats, top sources of potential threats, origin points of potential threats, event identifiers, types of analysis, bandwidth usage, source Internet Protocol (IP) addresses, destination IP addresses, importance, application details, port information, timestamps, time frames, user details, source device details, destination device details, levels of trust, source operating system details, virus scan levels and schedules.

13. The non-transitory computer-readable storage medium of claim 10, wherein the historical threat logs comprise information regarding one or more of a level of severity, the type of threat and source-destination attributes for each of the security threats detected by the one or more network security devices.

14. The non-transitory computer-readable storage medium of claim 10, wherein the interactive historical graph comprises one or more of a stacked area graph, a stacked bar chart, a stacked column chart, a line chart, a point chart, a pie chart, a histogram, a line chart, a tree chart, a organizational chart, a timeline chart, a flowchart, a cartogram, a pedigree chart, a waterfall chart, a polar area chart, and a bubble chart.

15. The non-transitory computer-readable storage medium of claim 10, wherein the method further comprises receiving from the administrator presentation parameters according to which the interactive historical graph is to be customized, wherein the presentation parameters include one or more of a parameter specifying a type of graph to be used for display of the plurality of threats, a parameter specifying zoom settings and a parameter specifying drag/select settings.

16. The non-transitory computer-readable storage medium of claim 10, wherein said presenting the extracted information in a form of an interactive historical graph comprises presenting one or more of information regarding trends and suggestions based on the plurality of threats, wherein the information regarding trends indicates one or more of a manner and mode in which the plurality of threats have taken place, and wherein the suggestions provide input regarding potential future threats.

17. The non-transitory computer-readable storage medium of claim 10, wherein the interactive historical graph is updated in real-time by continuously extracting information from the database based on the plurality of threat filtering parameters.

18. The non-transitory computer-readable storage medium of claim 10, wherein the interactive historical graph is updated at pre-defined intervals by periodically extracting information from the database based on the plurality of threat filtering parameters.

\* \* \* \* \*